United States Patent [19]

Riddel

[11] 4,158,398
[45] Jun. 19, 1979

[54] DUMP VALVE ASSEMBLY

[75] Inventor: John W. Riddel, Fenton, Mich.

[73] Assignee: General Motors Corporation, Detroit, Mich.

[21] Appl. No.: 809,206

[22] Filed: Jun. 23, 1977

[51] Int. Cl.² .................. B60K 31/00; F16K 31/06; F16K 31/62
[52] U.S. Cl. .................. 180/108; 91/453; 180/109; 251/67; 251/130
[58] Field of Search .............. 251/67, 74, 66, 130, 251/141; 180/108, 109; 137/624.27; 91/453

[56] References Cited

U.S. PATENT DOCUMENTS

| 966,672 | 8/1910 | Ellison | 251/67 |
|---|---|---|---|
| 976,839 | 11/1910 | Barton | 251/74 X |
| 2,688,460 | 9/1954 | Borgerd | 251/68 |
| 3,265,447 | 8/1966 | Bueler | 91/453 X |
| 3,511,276 | 5/1970 | Jessen et al. | 137/624.27 |
| 3,524,516 | 8/1970 | Bemmann | 180/108 |
| 3,742,971 | 7/1973 | Worthington | 137/624.27 X |
| 3,902,403 | 9/1975 | Clarke et al. | 91/418 |
| 4,080,873 | 3/1978 | Bauer et al. | 91/446 |

FOREIGN PATENT DOCUMENTS 2553011  6/1977  Fed. Rep. of Germany .......... 251/141

Primary Examiner—Irwin C. Cohen
Attorney, Agent, or Firm—D. D. McGraw

[57]  ABSTRACT

A two-position dump valve for use in a vacuum powered or pressure differential powered cruise control system. The dump valve is closed upon energization of a solenoid, provided the brake pedal is in the brake release position. It opens when the brake pedal is moved to actuate the vehicle brakes.

9 Claims, 4 Drawing Figures

DUMP VALVE ASSEMBLY

The invention relates to a dump valve for differential pressure powered cruise control systems and more particularly to one which is actuated upon electrical energization of the cruise control circuit so long as the brake pedal is in the brake release position. The valve controls the admission of atmospheric air pressure to the cruise control pneumatic circuit to prevent operation of the cruise control servomotor when the valve is open. The valve opens at any time that the brake pedal is moved to actuate the brake, whether or not the valve closing solenoid is energized. To accomplish this, first force-exerting means exerts a force on the valve element and yieldably acts to hold the valve element in position relative to the valve seat. Second force producing means, when acting on the valve element, exerts a force yieldably tending to urge the valve element away from the valve seat to open the valve. The second force-exerting means, when acting on the valve element, will exert a greater force on the valve element than the first force-exerting means so that the position of the valve element relative to the valve seat can be changed by the second force-exerting means. A third force-exerting means, which is preferably a solenoid connected in the cruise control electrical circuitry, is selectively energizable to exert a force on the valve element which is sufficient to overcome the force exerted on the valve element by the first force-exerting means and tends to close the valve when the valve is open. The exerted force of the third force-exerting means is less than the force of the second force-exerting means. The valve assembly has control means embodied as the brake pedal arm which operatively and selectively acts on the second force-exerting means to reduce the force of that means acting on the valve element at least to an amount which the third force-exerting means can overcome when the third force-exerting means is energized, to close the valve element against the valve seat. In one embodiment, the first force-exerting means is a spring continuously exerting its force to yieldably urge the valve element in a direction away from the valve seat. In another embodiment the first force-exerting means is a drag spring exerting a force yieldably holding the valve element in a position relative to the valve seat and tending to resist any movement of the valve element to another position relative to the valve seat.

IN THE DRAWING

Figure 1:
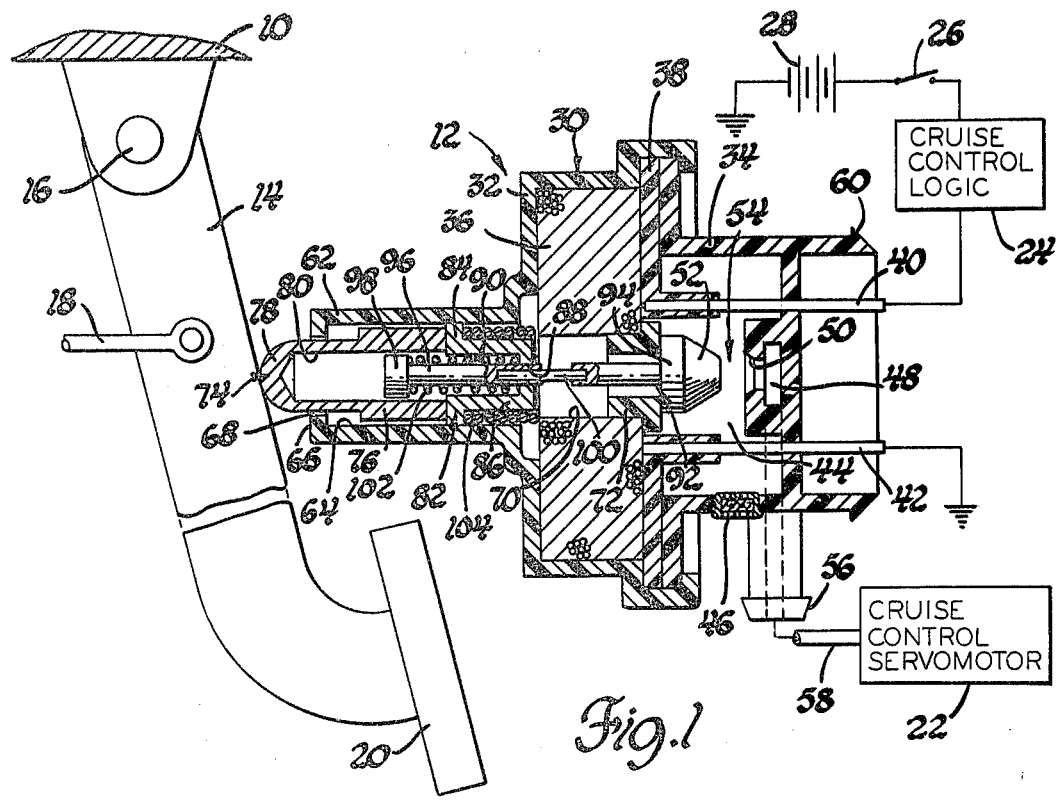
FIG. 1 is a cross section view of a valve assembly schematically illustrated as being installed in a vehicle as part of a cruise control system. The assembly is illustrated with the brake pedal arm in the brake release position and the cruise control system deenergized.

The vehicle 10 in which the valve assembly 12 embodying the invention is installed has a brake pedal arm 14 pivotally attached at 16 to a fixed portion of the vehicle. A brake actuating push rod 18 is suitably connected to the pedal arm 14 so that when the vehicle operator presses on brake pedal 20, the pedal arm 14 pivots clockwise as seen in the drawing about pivot 16 to move the push rod 18 to actuate the vehicle brake system. The brake pedal arm has a return spring, not shown, urging it to the brake release position.

The major portions of a cruise control system of a suitable type are schematically illustrated. These include a cruise control servomotor 22 of the pressure differential actuated type, which can be rendered inactive by admission of atmospheric air to its power chamber. Appropriate cruise control logic 24 is provided and is schematically illustrated as being electrically connected through the switch 26 to a source of electricity such as battery 28.

The valve assembly 12 includes a housing 30 having a front housing section 32 and a rear housing section 34. A solenoid coil 36 is received in housing section 32, with an enlarged portion of the housing section 32 and a plate 38 cooperating with the solenoid coil 36 to form a solenoid bobbin assembly. The housing section 34 fits against plate 38 and is suitably secured to housing 30 on the other side of plate 38 from solenoid coil 36. Electrical leads 40 and 42 extend through plate 38 to connect with solenoid coil 36. Lead 40 is illustrated as being electrically connected to cruise control logic 24, while lead 42 is illustrated as being connected to ground. Thus when switch 26 is closed and logic 24 is energized, the solenoid coil 36 is electrically energized. Leads 40 and 42 extend through a chamber 44 formed in housing section 34. This chamber is connected to atmospheric air by an air vent and filter 46. Housing section 34 is formed with a passage 48 opening at one end into chamber 44 through valve seat 50. Valve seat 50 and valve element 52, further described below, form the dump valve 54. Passage 48 extends outwardly of housing section 34 and has a nipple connection 56 to secure a hose thereto. The passage is schematically illustrated as being connected by a hose 58 to the cruise control servomotor 22. Housing section 34 is provided with a mounting flange 60 which may be snapped into position in an aperture providing a suitable mounting for the valve assembly 12.

The forward portion 62 of housing section 32 has a cylinder 64 formed therein with the outer end terminating at an end flange 66 through which an aperture 68 is provided. The inner end of cylinder 64 opens into the portion of the housing section 32 containing solenoid coil 36. The solenoid coil is annular, being provided with a center aperture 70 of somewhat smaller diameter than cylinder 64 to provide a spring seat as will be described. An annular flanged stop 72 is inserted within the aperture 70 with the flanged end facing chamber 44.

A button or plunger 74 has a flange 76 formed on one end, the button being received within cylinder 64 and having its forward end 78 extending outwardly of housing section 32 through aperture 68. Flange 76 guides button 74 in reciprocal movement in cylinder 64 and is engageable with flange 66 to limit the outward movement of the button. Button 74 has a recessed cylinder 80 formed therein and opening rearwardly. A spring seat 82 has a flange end 84 reciprocably received in cylinder 64 and in abutting relation with the terminal side of flange 76. The main body 86 of spring seat 82 extends rearwardly toward aperture 70 of solenoid 36. The rear end of the main body 86 has an aperture 88 therein connecting the interior of aperture 70 with a recess 90 formed in spring seat 82. Recess 90 opens through flange 84 into the recessed cylinder 80 of button 74.

A valve element assembly 92 has valve element 52 formed on a head 94 at one end, and a valve stem 96 extending through annular stop 72, aperture 88, recess 90, and into cylinder 80. The forward end 98 of valve stem 96 is enlarged to be guided in reciprocal movement in cylinder 80 and to provide a spring seat. A portion of stem 96 extending into aperture 70 through aperture 88 is of a magnetic material which provides an armature 100 for the solenoid coil 36. A relatively light compression spring 102 is positioned about a portion of valve stem 96 so that one end of the spring engages the enlarged forward end 98 of the stem 96 and the other end of the spring engages the bottom of recess 90 of spring seat 82 adjacent aperture 88. Thus spring 102 exerts a force on the valve element assembly 92 yieldably holding the valve element 52 in a position relative to valve seat 50. More particularly, spring 102 continuously exerts its force to yieldably urge the valve element 52 away from valve seat 50 and hold it in such a position. Another spring 104 is positioned about the main body of spring seat 82 so that one end engages flange 84 and the other end is seated on the edge of solenoid 36. Spring 104 is a compression spring having greater force than spring 102. It acts to yieldably urge spring seat 82 in a direction away from valve element 52, and therefore continuously urges button 74 outwardly of housing section 32.

The valve assembly 12 is shown in FIG. 1 with the vehicle brake pedal arm 14 in the brake release position and the solenoid 36 deenergized. The brake pedal return force acting on pedal arm 14 holds the pedal arm in the position shown against button 74 to compress spring 104 and therefore effectively reduces the force of spring 104, insofar as it can operatively act on valve element 52, to a force level at least no greater than the force exerted on the valve element assembly by spring 102. In the particular embodiment shown in FIGS. 1-3, the force of spring 104 is effectively removed from acting on the valve element assembly 92 under this condition. Spring 102 therefore expands to move the valve stem assembly leftwardly until head 94 engages stop 72. Spring 102 therefore holds the valve element 52 away from valve seat 50, permitting atmospheric air to be delivered to the cruise control servomotor 22 through hose 58, passage 48, valve 54 and chamber 44 when the cruise control system is energized while the brake pedal arm 14 is still in the brake release position shown in FIGS. 1 and 2. The magnetically attractive force acting on armature 100 and generated by the energized solenoid coil 36 is sufficient to move the valve element assembly 92 rearwardly (rightwardly as seen in the Figures), overcoming the relatively light force of spring 102 and seating valve element 52 against its valve seat 50, closing valve 54. This prevents atmospheric air from entering passage 48, and therefore the power chamber of the servomotor 22 can be energized with a differential pressure to actuate the cruise control system in a manner well known in the art.

Figure 2:
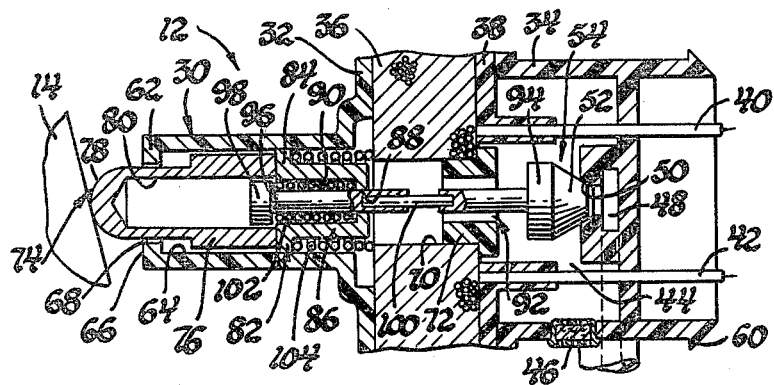
FIG. 2 is a fragmentary view of the valve portion of the structure illustrated in FIG. 1, the cruise control system, and therefore the solenoid of the valve assembly, being energized to close the valve.
Figure 3:
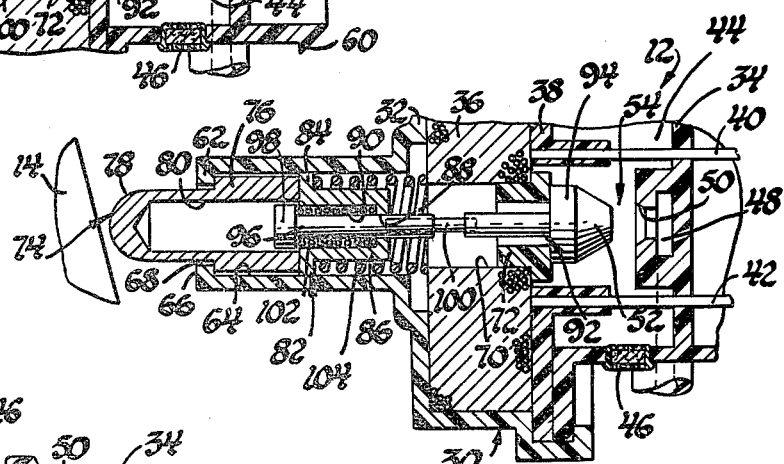
FIG. 3 is a view similar to FIG. 2, but with the brake pedal arm moved in the brake actuating direction so that the valve is opened.

It can be seen that as the brake pedal arm 14 is pivoted clockwise for brake actuation, it moves away from valve assembly 12. This action is illustrated in FIG. 3. Even if solenoid 36 remains energized, which normally would not be the case because switch 26 is usually connected to open upon brake actuation, spring 104 is sufficiently strong to overcome the force exerted on armature 100 by solenoid coil 36. Spring 104 therefore expands, moving spring seat 82 and button 74 leftwardly, compressing spring 102 and acting through spring 102 to move the valve element assembly 92 leftwardly. This causes valve element 52 to move away from valve seat 50, reopening the cruise control servomotor 22 to atmospheric air and therefore preventing the servomotor from controlling action in a cruise control mode. This condition is shown in FIG. 3. In the embodiment of FIGS. 1, 2 and 3, if the brake pedal arm is released to move power to the brake release position and solenoid coil 36 is reenergized or has remained energized, the valve element 52 will again be moved to close against valve seat 50. Thus the assembly will return to the position shown in FIG. 2. If solenoid 36 remains deenergized, the assembly 12 will return to the position shown in FIG. 1. The force of brake pedal arm 14 will compress spring 104, allowing spring 102 to continue to hold the valve element assembly 92 in the valve open position.

Figure 4:
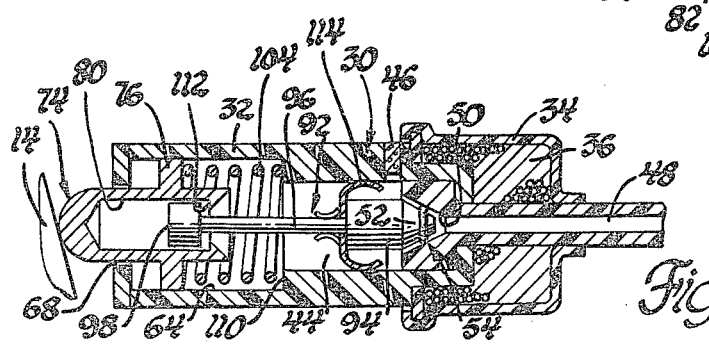
FIG. 4 is a cross section view of a modified valve embodying the invention and showing the valve in the same operative condition as that of the valve in FIG. 2.

The valve assembly of FIG. 4 is a modification of the valve assembly of FIGS. 1, 2 and 3. It operates in a similar manner. Elements having functionally identical identity with elements of the assembly of FIG. 1 are provided with the same reference characters. In this modification, the rearward end of cylinder 64 has a shoulder 110 against which the rearward end of spring 104 is seated. The button recessed cylinder 80 has its open end provided with an inwardly extending shoulder 112 which is axially engageable with the end 98 of the valve stem 96. The head 94 of the valve element assembly 92 also acts as the armature for solenoid 36, valve element 52 being provided by an O-ring mounted in a groove on the end of head 94 so that it is engageable with valve seat 50. The portion of cylinder 64 rearwardly of shoulder 110 receives the valve stem head 94 therein. A drag spring 114 is fitted to valve stem 96 so that it is not axially mounted on the valve element assembly, but engages the wall of cylinder 64 between shoulder 110 and valve seat 50. Spring 114 is functionally similar to spring 102 of the first embodiment, and exerts a force yieldably holding the valve element assembly in a position relative to the valve seat. More particularly, the force exerted by spring 114 tends to resist any movement of the valve element assembly from any valve element position to any other valve element position relative to the valve seat.

When brake pedal arm 14 of FIG. 4 is moved away from button 74 upon brake actuation, spring 104 expands to move the button leftwardly. Shoulder 112 engages valve stem assembly end 98. Further button movement under the force of spring 104 overcomes the force of drag spring 114, pulling valve element 52 away from valve seat 50. Thus the valve 54 is opened and atmospheric air enters passage 48 through air valve and filter 46, chamber 44, and the open valve 54. With solenoid coil 36 deenergized, the valve element assembly 92 will remain in the leftward position with valve 54 open even after pedal arm 14 moves button 74 rightwardly to compress spring 104. Only upon reenergization of solenoid 36 will valve 54 again be closed. If solenoid coil 36 is energized while spring 104 is expanded because of brake pedal arm brake actuating movement, the force exerted on valve element 92 is insufficient and the drag force of spring 114. However, with the effective force of spring 104 reduced or removed from acting on the valve element assembly 92, the energized solenoid coil 36 is sufficiently strong to overcome the drag force of spring 114 and close valve 54.

What is claimed is:

1. An improved dump valve assembly in combination with a vehicle brake actuator for permitting operation of a differential pressure operated vehicle cruise control system when the brake actuator is in the brake release position and for preventing operation of the vehicle cruise control system when the brake actuator is in the brake actuating position, said valve assembly comprising:

a valve defined by a valve seat and a valve element cooperating therewith to close and open said valve to respectively permit operation and prevent operation of the vehicle cruise control system by respectively permitting introduction of a differential pressure into the differential pressure operated vehicle cruise control system and preventing said introduction by dumping the cruise control system to a single pressure;

a first spring continuously exerting a force on said valve element and yieldably acting to hold said valve element in position relative to said valve seat;

a second spring when acting on said valve element exerting a force yieldably tending to urge said valve element away from said valve seat and toward said brake actuator, said second spring exerting a greater force than said first spring so that the position of said valve element relative to said valve seat can be changed by said second spring; and force-exerting means selectively energizable by initiation of operation of the vehicle cruise control system with said brake actuator in the brake release position to exert a force on said valve element overcoming the force exerted thereon by said first spring and tending to close said valve when said valve is open, the exerted force of said force-exerting means being greater than the force of said first spring but less than the force of said second spring;

said brake actuator operatively and selectively acting on said second spring when in the brake release position to reduce the force of said second spring acting on said valve element at least to an amount which said force-exerting means can overcome when energized to close said valve, and when in the brake applying position permitting said second spring to exert a force on said valve element moving said valve element away from said valve seat in opposition to any forces exerted on said valve element by said first spring and said force-exerting means.

2. The valve assembly of claim 1,
said first spring being a drag spring exerting a force on said valve element tending to resist any movement of said valve element from any valve element position to any other valve element position relative to said valve seat.

3. The valve assembly of claim 1,
said first spring continuously exerting its force to yieldably urge said valve element in a direction away from said valve seat;
said second spring continuously exerting a force yieldably urging said first spring and, through said first spring, said valve element in a direction tending to further urge said valve element away from said valve seat.

4. A valve assembly comprising:
a valve defined by a valve seat and a valve element cooperating therewith to open and close said valve;

first yieldable force-exerting means continuously exerting a first force on said valve element in a direction other than a valve closing direction and yieldably acting to hold said valve element in position relative to said valve seat;

second force-exerting means when acting on said valve element exerting a second force yieldably tending to urge said valve element away from said valve seat, said second force-exerting means exerting a sufficient second force on said valve element so that the position of said valve element relative to said valve seat can be changed by said second force-exerting means;

third force-exerting means selectively energizable to exert a third force acting on said valve element, said third force when so acting overcoming said holding action of said first force exerted on said valve element by said first force-exerting means and acting in a direction tending to close said valve when said valve is open, said exerted third force of said third force-exerting means being greater than said first force of said first force-exerting means but less than said second force of said second force-exerting means whereby said second force can override said third force; and valve assembly control means including means for selectively energizing and deenergizing said third force-exerting means and other means operatively and selectively acting on said second force-exerting means to reduce the amount of said second force acting on said valve element at least to an amount which said third force can overcome to close said valve when said third force-exerting means is energized.

5. A valve assembly comprising:
a valve defined by a valve seat and a valve element movable relative to said valve seat and cooperating therewith to open and close said valve;

a first spring acting on said valve element and exerting a first force on said valve element in other than a valve closing direction and yieldably holding said valve element in a position relative to said valve seat;

a second spring when operatively acting on said valve element exerting a second force urging said valve element away from said valve seat, said second force exerted by said second spring on said valve element being a sufficient force so that the position of said valve element relative to said valve seat can be changed by said second spring;

force-exerting means selectively energizable to exert a third force on said valve element overcoming said first force of said first spring acting on said valve element but less than said second force of said second spring whereby said second force can override said third force; and valve assembly control means including means for selectively energizing and deenergizing said force-exerting means, and other means operatively and selectively acting on said second spring to reduce the amount of said second force of said second spring acting on said valve element at least to a force level which said third force, generated upon energization of said force-exerting means, can overcome, said third force when said valve is open then causing said valve element to move to engage said valve seat and close said valve irrespective of said first force.

6. A valve assembly comprising:
a normally open valve defined by a valve seat and a valve element cooperating therewith to open and close said valve;
first force-exerting means continuously exerting a force yieldably urging said valve element in a direction away from said valve seat;
second force-exerting means continuously exerting a force yieldably urging said first force-exerting means in a direction tending to further urge said valve element away from said valve seat, said second force-exerting means exerting a greater force than said first force-exerting means;
third force-exerting means selectively energizable to exert a force on said valve element overcoming the force exerted thereon by said first force-exerting means and tending to close said valve, the exerted force of said third force-exerting means being greater than the force of said first force-exerting means but less than the force of said second force-exerting means whereby said second force exerting means can override said third force exerting means; and
valve assembly control means including means for selectively energizing and deenergizing said third force-exerting means and other means operatively acting on said second force-exerting means to selectively reduce the force thereof acting on said first force-exerting means to a force level providing only reaction equal to the force exerted by said first force-exerting means, said last named means providing reaction for the remainder of the force exerted by said second force-exerting means.

7. A valve assembly comprising: a normally open valve defined by a valve seat and a valve element movable relative to said valve seat and cooperating therewith to open and close said valve;
a first spring acting on said valve element and exerting a force yieldably urging said valve element in a direction away from said valve seat;
a second spring operatively providing reaction for said first spring and exerting a force thereon urging said first spring in a direction tending to further urge said valve element away from said valve seat, said second spring exerting a greater force than said first spring;
force-exerting means selectively energizable to exert a force on said valve element opposing the force of said first spring and greater than the force of said first spring but less than the force of said second spring whereby the force of second spring can override the force of said force-exerting means; and
valve assembly control means including means for selectively energizing and deenergizing said force-exerting means, and other means operatively acting on said second spring to selectively reduce the force thereof acting on said first spring to a force level producing only reaction force equal to the reaction force exerted by said first spring, said other means then providing reaction for the remainder of the force exerted by said second spring.

8. A valve assembly comprising:
a housing;
a normally open valve in said housing, said valve being defined by a valve seat on said housing and a valve element movable in said housing relative to said valve seat and cooperating therewith to open and close said valve;
a first spring in said housing operatively acting on said valve element and exerting a force yieldably urging said valve element in a direction away from said valve seat;
a second spring in said housing operatively reacting on said housing and operatively providing reaction for said first spring and operatively exerting a force on said first spring urging said first spring in a direction tending to further urge said valve element away from said valve seat, said second spring exerting a greater total force than said first spring;
a solenoid armature secured to said valve element for movement therewith in said housing;
a solenoid coil in said housing and receiving said solenoid armature and selectively energizable to exert a force on said valve element through said solenoid armature which opposes the force of said first spring and is greater than the force of said first spring but less than the total force of said second spring whereby the total force of said second spring can override the force exerted by said solenoid coil; and
valve assembly control means including means for selectively energizing and deenergizing said solenoid coil and other means operatively selectively acting on said second spring with a reaction force greater than the difference between the total force of the second spring and the force of reaction between said first and second springs to limit the force of said second spring acting on said first spring to a force level providing only reaction force no greater than the reaction force exerted on said second spring by said first spring, said other means then providing reaction for the remainder of the force exerted by said second spring.

9. A valve assembly comprising:
a housing having a chamber formed therein, first and second ports opening into said chamber, and a valve seat formed about said first port;
a valve member having a valve element and a valve stem and a valve stem head, said valve member being reciprocably received in said housing for axial movements toward and away from said valve seat so that in a first valve member axial position said valve element cooperates with said valve seat to close said first port and in a second valve member axial position said valve element is axially spaced from said valve seat to open said first port to said chamber and thereby fluidly connect said first and second ports, at least a part of said valve member being a solenoid core;
a solenoid coil mounted in said chamber about said solenoid core and fixed to said housing, said solenoid core when energized magnetically urging said solenoid core and therefore said valve member axially toward said valve seat, thereby tending to close said first port;
a plunger having a bore with a closed end and an open end, said plunger being reciprocably received in said chamber with the closed end thereof extending outwardly of said housing from said chamber in the axially opposite direction from said valve seat, said plunger and said housing having cooperating stops formed thereon limiting movement of said plunger in an axial direction away from said valve seat and outwardly of said housing;

an annular spring seat in said chamber engaging said plunger open end and having said valve stem extending axially therethrough, a portion of said annular spring seat being operatively engageable axially with said valve stem head, said valve stem head being positioned axially within said plunger bore;

a first spring in said chamber operatively acting on said housing and on said spring seat and urging said spring seat and said plunger in a direction axially away from said valve seat;

a second spring in said chamber and also in said plunger bore, said second spring acting on said spring seat and said valve stem head and urging said valve member axially away from said valve seat, said second spring having a spring rate and load incapable of moving said valve member axially in opposition to the magnetic urging of said solenoid when said solenoid is energized;

said first spring having a spring rate and load capable of moving said spring seat and said plunger against the force of said second spring to operatively engage said spring seat and said valve stem head and then to further move said spring seat and said plunger and said valve member axially in opposition to the magnetic urging of said solenoid coil when said solenoid coil is energized; and control means having a first position engaging said plunger closed end and opposing the force of said first spring to hold said plunger and said spring seat in a position axially toward said valve seat and permitting axial movements of said valve member between and to said valve member first and second axial positions, and a second position disengaged from said plunger;

said second spring holding said valve element away from said valve seat when said control means is in its first position until said solenoid coil is energized to overcome said second spring and axially move said valve element to seat on said valve seat and close said first port, said second spring acting upon deenergization of said solenoid coil to move said valve member to open said valve element relative to said valve port;

said first spring acting upon movement of said control means to its second position to operatively move said valve member to open said first port when said solenoid coil is energized, and to move said spring seat to further load said second spring in the valve opening direction whether or not said solenoid coil is energized.

* * * * *

UNITED STATES PATENT AND TRADEMARK OFFICE
CERTIFICATE OF CORRECTION

PATENT NO. : 4,158,398
DATED : June 19, 1979
INVENTOR(S) : John W. Riddel

It is certified that error appears in the above-identified patent and that said Letters Patent are hereby corrected as shown below:

Column 4, line 37, "mounted" should read movable.

Column 7, claim 7, line 60, "producing" should read providing.

Column 8, claim 9, line 56, "core" should read coil.

Signed and Sealed this

Ninth Day of October 1979

[SEAL]

Attest:

RUTH C. MASON
Attesting Officer

LUTRELLE F. PARKER
Acting Commissioner of Patents and Trademarks